Figure 1:
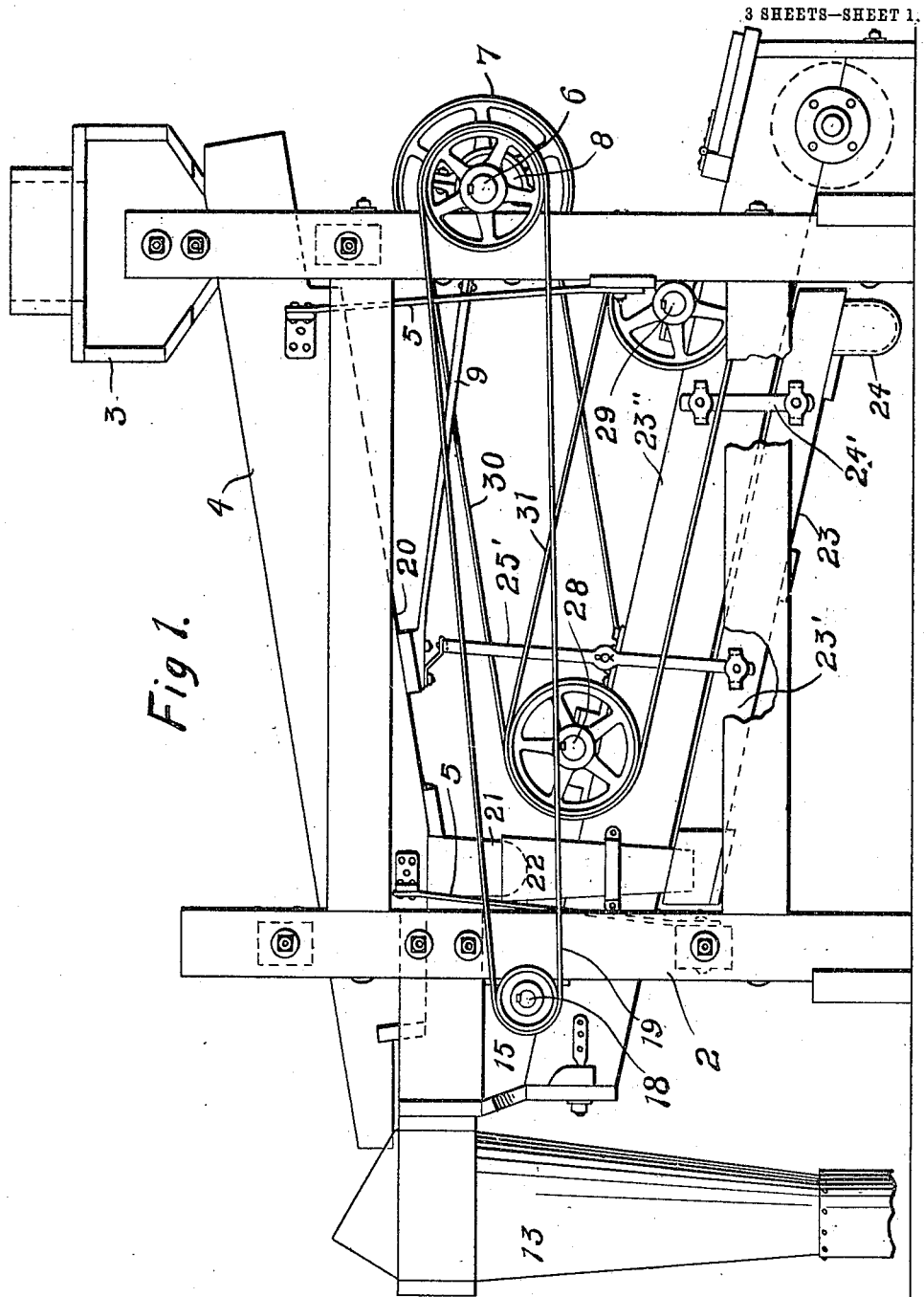

No. 839,415. PATENTED DEC. 25, 1906.
R. J. OWENS.
MACHINE FOR CLEANING BEANS AND PEAS.
APPLICATION FILED FEB. 7, 1905.

3 SHEETS—SHEET 1.

WITNESSES.

INVENTOR
ROBERT J. OWENS.
BY
HIS ATTORNEYS.

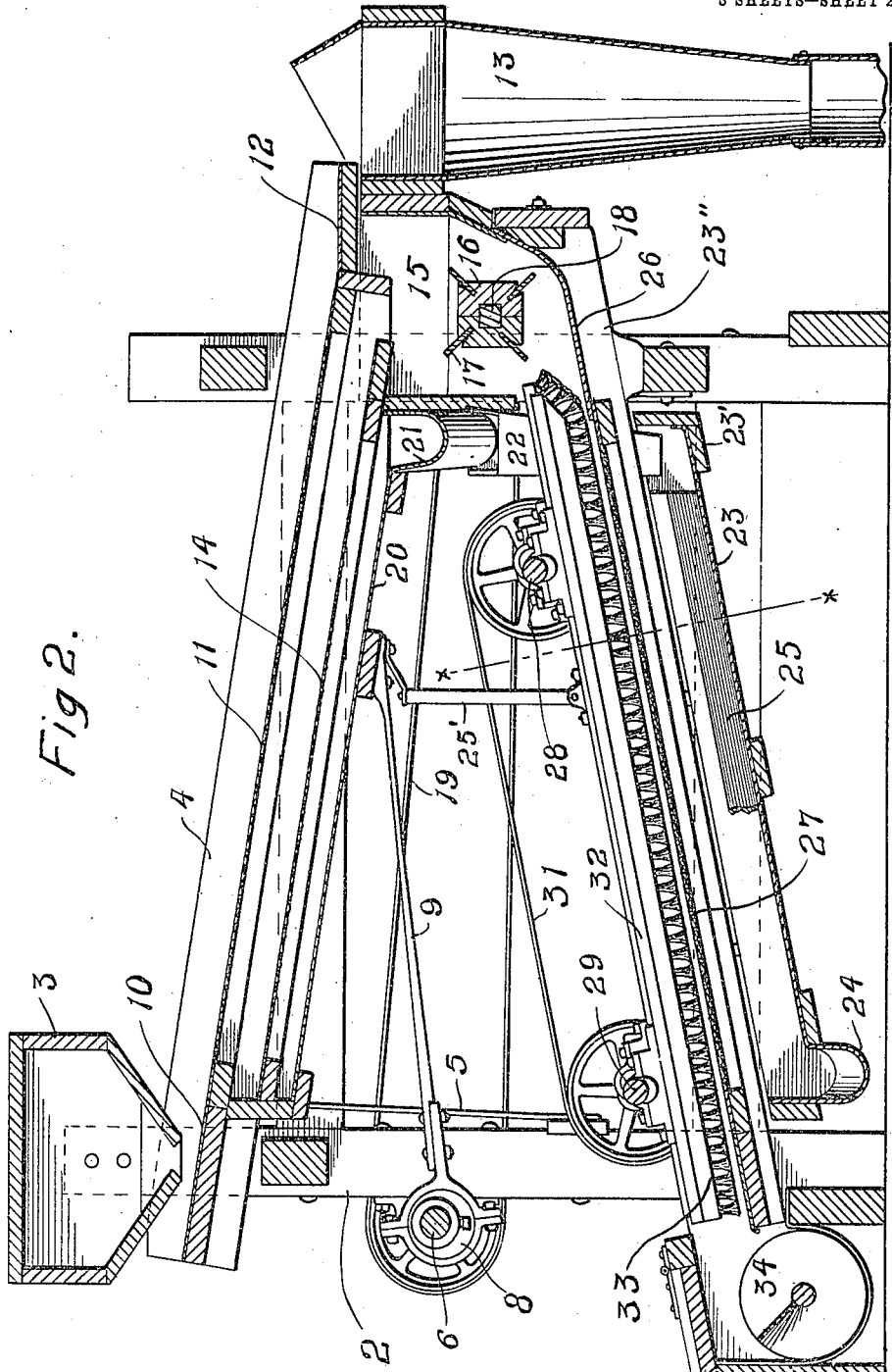

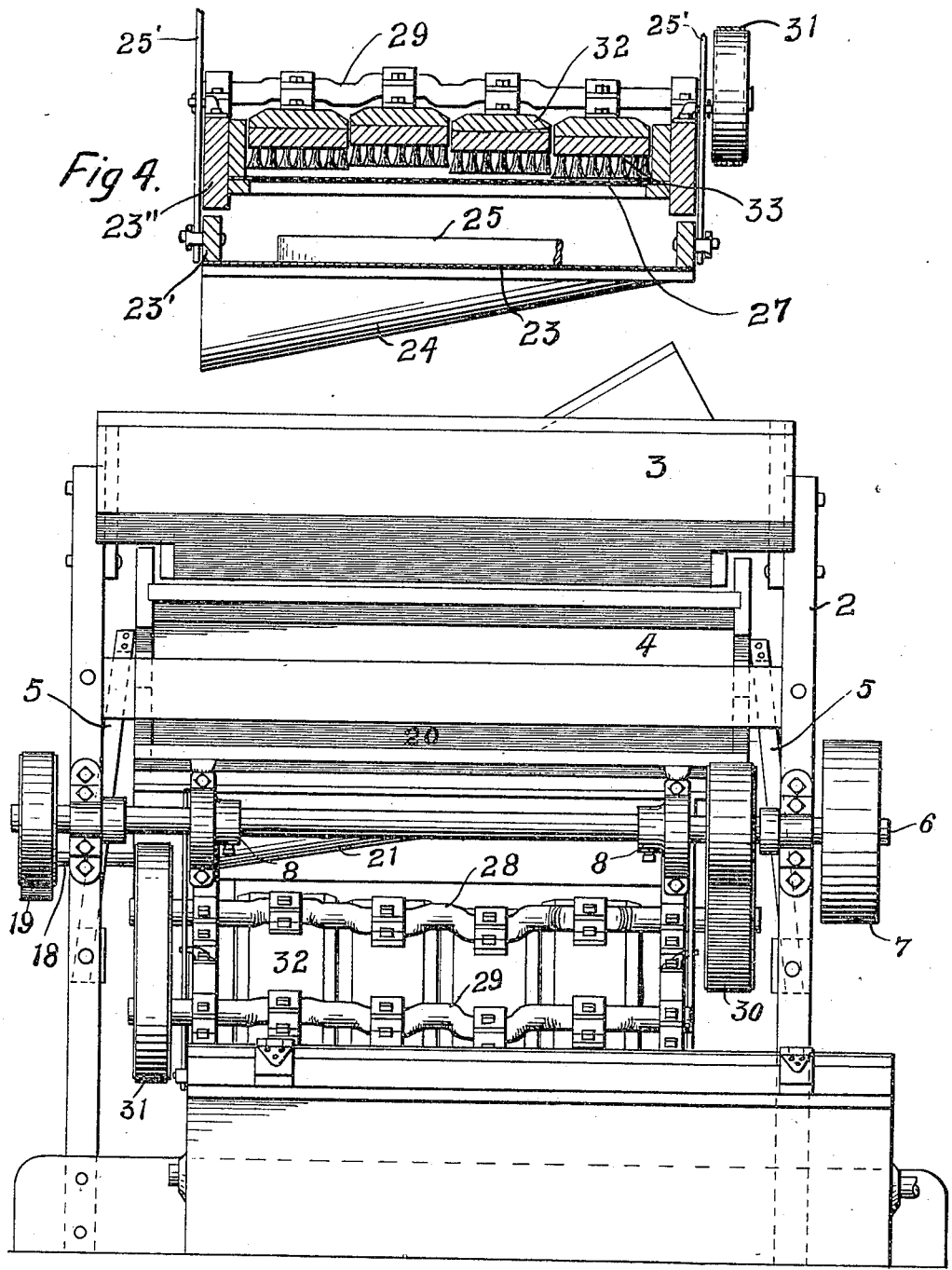

UNITED STATES PATENT OFFICE.

ROBERT J. OWENS, OF MINNEAPOLIS, MINNESOTA.

MACHINE FOR CLEANING BEANS AND PEAS.

No. 839,415.  Specification of Letters Patent.  Patented Dec. 25, 1906.

Application filed February 7, 1905. Serial No. 244,551.

*To all whom it may concern:*

Be it known that I, ROBERT J. OWENS, of Minneapolis, Hennepin county, Minnesota, have invented certain new and useful Improvements in Machines for Cleaning Beans and Peas, of which the following is a specification.

In growing beans and peas and similar agricultural productions it has been found, particularly where the soil is of a clayey nature, that considerable quantities of dirt will adhere to the pods and vines and be mixed with them in a loose lumpy form and remain with the beans or peas after threshing to such an extent as to render them unfit for marketing purposes. Frequently the lumps of dirt are nearly the same size and shape as the bean or pea, and it is practically impossible to separate them by the ordinary process.

The object, therefore, of my invention is to provide a machine that will effectually separate the lumps and loose particles of dirt from the beans or peas and thoroughly clean the latter, delivering them in suitable condition for the market.

The invention consists generally in various constructions and combinations, all as hereinafter described, and particularly pointed out in the claims.

In the accompanying drawings, forming part of this specification, Figure 1 is a side elevation of a bean or pea cleaning machine embodying my invention. Fig. 2 is a longitudinal vertical section of the same. Fig. 3 is an end view, and Fig. 4 is a sectional view, on the line *x x* of Fig. 2.

In the drawings, 2 represents a suitable frame whereon a hopper 3 is mounted. Beneath the discharge-opening of said hopper is a shoe 4, supported upon straps 5 and having a longitudinal reciprocating movement thereon. A driving-shaft 6, having a pulley 7, is mounted in said frame and is provided with eccentrics 8, connected by pitman-rods 9 with the shoe-frame 4, and whereby a reciprocating oscillating movement is imparted to said frame in the usual way. An imperforate plate 10 is provided beneath the hopper 3 whereon the material falls, and a sieve 11 of coarse mesh is arranged to form an extension of said plate leading to a point near the tail or discharge end of the shoe, where a second imperforate plate 12 is arranged to receive the material from said sieve and deliver it to a spout 13. The meshes of the sieve 11 are sufficiently coarse to allow the beans or peas to fall through and also permit the passage of sand and lumps of dirt that correspond in shape and size to the material that is being cleaned. The broken pods, stems, and coarse lumps of clay or sand will be discharged from the sieve upon the plate 12 and from thence into the spout 13. Beneath the sieve 11 is a shorter sieve 14 of finer mesh, which will allow the passage of sand and very small lumps of dirt and refuse material, but will not permit the passage of the large lumps and the beans or peas. These will be directed down over the tail end of the sieve into a trunk 15, where a beater 16, having a series of blades 17, is mounted on a shaft 18, driven through a belt 19 from the driving-shaft 6. This beater is operated at a suitable speed to break up the lumps of dirt delivered thereto and also loosen any particles of dirt or clay that may be clinging to the bean or pea berry.

Beneath the sieve 14 is an imperforate plate 20, whereon the sand and fine material falls and is conducted thereby to a transverse spout 21, that discharges into a vertical spout 22, whose lower end is arranged to deliver upon an imperforate plate 23 in the bottom of the machine, having a discharge-spout 24 at its lower end. A slat 25 is arranged on the plate 23 to guide the material from the receiving-spout over to the discharge-spout 24. The plate 23 is carried by a shoe 23', supported from a fixed shoe 23'' by straps 24'. A bar 25', pivoted at a point intermediate to its ends on the shoe 23', is connected at its upper end to the shoe 4 and at its lower end to the shoe 23' to oscillate the same when the shoe 4 is operated. Beneath the beater is an imperforate plate 26, from which the material passes onto a sieve 27, mounted in the fixed shoe 23'. Above this sieve are crank-shafts 28 and 29, the former having a belt connection 30 with the drive-shaft 6 and said crank-shafts being connected with one another through a belt 31. Upon these crank-shafts a series of bars 32 are mounted. There are preferably four of these bars in a machine of this size, extending lengthwise of the sieve 27 and parallel with one another and supported at each end by the crank-shafts and moved thereby toward and from the surface of the sieve 27. A series of brushes 23 are provided on the under side of these bars and adapted to engage the upper surface of the sieve and the bean or pea berries thereon and clean the surfaces thereof of any dust or dirt that may be clinging thereto and also crush or break up or pulverize any lumps of dirt or clay that may have passed the beater with the berries.

The brushes extend a sufficient distance over the surface of the sieve 27 to insure a thorough cleaning of the beans or peas and deliver them at the lower end of the sieve to the transverse conveyer 34 in a clean and marketable condition.

I claim as my invention—

1. The combination, with a frame, of an oscillating shoe therein, a sieve mounted in said shoe and having meshes sufficiently coarse to permit the passage of fine material and bean or pea berries and lumps of dirt of similar size a second sieve beneath said first-named sieve, and having a sufficiently fine mesh to prevent the passage of the pea or bean berries and the coarser lumps of dirt while allowing the fine material to fall through, an imperforate plate beneath said second sieve, a spout connected therewith, a trunk arranged to receive the pea and bean berries and lumps of dirt from the tail end of said second sieve, a revolving beater arranged in said trunk, a sieve leading from said trunk and inclining in the opposite direction to the upper sieves, and gyrating brushes acting upon the surface of the sieve leading from said trunk, substantially as described.

2. The combination, with a suitable frame, of an inclined sieve therein of sufficiently fine mesh to prevent the passage of bean or pea berries, gyrating brushes arranged above said sieve and adapted to engage and clean the surface of the berries passing thereover, a reciprocating shoe carrying sieves located above the first-mentioned sieve, and means connecting said shoe and the sieve below said brushes for oscillating said sieve, substantially as described.

In witness whereof I have hereunto set my hand this 31st day of January, 1905.

ROBERT J. OWENS.

Witnesses:
  RICHARD PAUL,
  C. MACNAMARA.